F. ROBINSON.
SPRING SUPPORT FOR MOTOR CYCLE AND OTHER SADDLES.
APPLICATION FILED APR. 26, 1910.
1,015,712.
Patented Jan. 23, 1912.
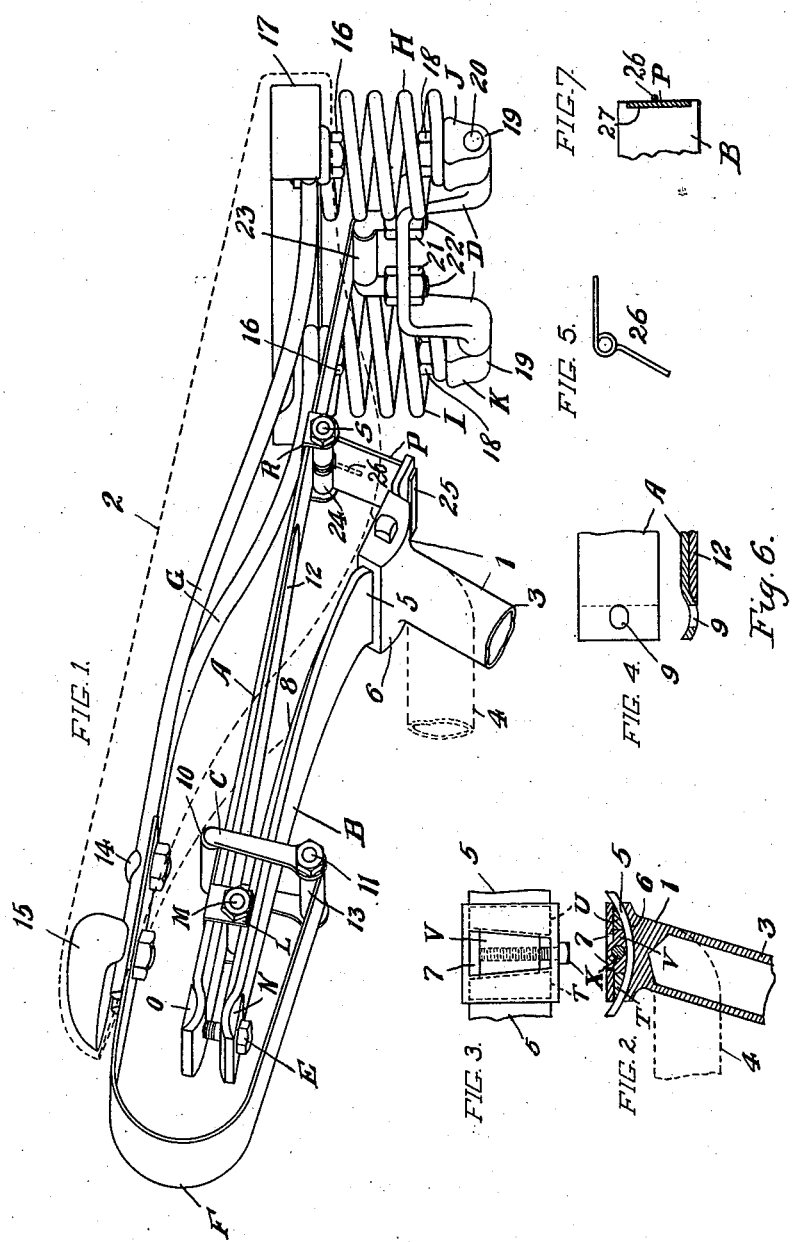
Witnesses:
J. S. Barker
L. C. Brady.
Inventor:
Frederick Robinson
by H. N. Low
Atty.

UNITED STATES PATENT OFFICE.

FREDERICK ROBINSON, OF CHICAGO, ILLINOIS.

SPRING-SUPPORT FOR MOTOR-CYCLE AND OTHER SADDLES.

1,015,712.     Specification of Letters Patent.     Patented Jan. 23, 1912.

Application filed April 26, 1910. Serial No. 557,674.

*To all whom it may concern:*

Be it known that I, FREDERICK ROBINSON, a citizen of the United States, residing at Chicago, in the county of Cook and State of Illinois, have invented certain new and useful Improvements in Spring-Supports for Motor-Cycle and other Saddles, of which the following is a specification.

The invention relates to means for suspending or supporting a saddle for motor cycles or analogous vehicles with the result of more perfectly absorbing vertical and horizontal shocks than in constructions heretofore used or proposed.

The invention comprises two double-leaf longitudinal springs from and by which the seat is suspended and directed in its movements; also other features of improvement; all of which are hereinafter set forth.

In order to make the invention more clearly understood I have shown in the accompanying drawings means for carrying the same into practical effect, without limiting my improvements, in their useful applications, to the particular construction which, for the sake of example, I have delineated.

In said drawings—Figure 1 is a perspective view of a motor cycle saddle having supporting means embodying the invention. Fig. 2 is a vertical sectional view of the upper part of the seat post. Fig. 3 is a plan view of the latter. Fig. 4 is a plan view of the end of the spring A. Fig. 5 is a side view of the spring which holds the check plate disengageably against the spring B. Fig. 6 is a sectional view of the spring shown in Fig. 4. Fig. 7 is a plan view of the rear end of the spring B showing the check plate and spring in section.

Referring to the drawings, 1 indicates the seat post, and 2 the saddle, the latter being indicated in dotted lines for the sake of clearness of the other parts.

The seat post may terminate in a downward extension 3 adapted to be inserted into a vertical or inclined socket in the motor frame, or may terminate in a horizontal extension 4, shown in dotted lines, adapted to fit into a horizontal socket or bar of such frame.

B is the lower element of the double leaf spring formed with a curved portion 5 which fits in a corresponding socket 6 in the post 1, so as to admit of forward and backward adjustment to give the seat the desired tilt longitudinally and vertically.

T and U indicate clamping wedges which may be inserted into the socket 6, above the spring B, through an opening 7. Between these wedges is an expanding wedge V into which screws a bolt X. By the latter the clamping wedges may be forced forward and backward to securely hold the spring B in its adjusted position.

By preference I combine with the spring B and on top of the same a taper leaf spring member 8.

A is the upper element of the double leaf spring arranged above the element B and extending rearwardly to near the end of the saddle. It may have on its under side a reinforcing tapering spring leaf 12. At the front end it is united with the spring B by a bolt E which passes through a washer N below the lower spring, through elongated holes 9 in the springs, and screws into a nut O above the upper spring. The ends of the springs are preferably curved as shown and the inner faces of the washer and nut are correspondingly curved, thus giving an even bearing in all compressed positions of the springs. The bolt E is used to vary the combined tension of the two elements of the double spring A B so as to suit riders of different weights with equal comfort.

M is a clamp bolt passing transversely between the springs A and B, holding them apart and acting as a fulcrum for the action of the rear end of the spring A. This bolt passes through perforations in the end flanges of a clasp L which rests on the spring A and embraces and holds in line the springs A and B. The upper part of the clasp L is provided with a tubular bearing 10 in which is pivotally held a rocker C, the lower ends of which are united by a transverse bolt 11.

The parts A and B, combined as described, form a V-shaped spring from which the saddle may be conveniently suspended, and which is perfectly adjustable as to tension.

F is a U-shaped leaf spring which supports the front end of the saddle. It is formed with a tubular pivotal bearing 13 which fits around the bolt 11, and the upper end of the spring is united by clamps 14 with the front ends of the saddle stretcher rods G and pommel 15. The rear ends of the stretcher rods are secured by bolts 16 with the cantle 17.

The rear end of the saddle is carried by coiled springs H, I, the upper ends of which are secured by the bolts 16. The lower ends of these coiled springs rest on pivot blocks J, K, and are held thereto by bolts 18. The blocks J, K are formed with transverse tubular bearings 19 which embrace the pivot ends 20 of the rear rocker D. This rocker is united by nuts 21 with a U-shaped journal 22 which is embraced by the tubular bearing 23 formed at the rear end of the spring A.

P is a check plate which prevents the springs A and B from springing too far apart when the saddle is relieved of the rider's weight. This check plate is formed at its upper end with a tubular bearing 24 which embraces a transverse clamp bolt S. The latter passes through the ears of a clasp R which rests on the spring A and is clamped thereto by the said bolt S. The lower end of the check plate passes down against, or through a slot 27 in the rear end of the spring B and is formed with a lip or hook 25 which engages under such spring to limit the upward movement of the check plate. The clasp R is adjustable longitudinally on the spring B so as to cause the check plate to point downward, or diagonally downward, when the springs A, B, are compressed, without striking any portion of the cycle frame. The check plate is held in the slot in which it moves by a V-shaped spring 26 which is placed between the under side of the spring A and the back of the check plate. While limiting the separation of the springs A and B, the check plate also keeps the springs in line one above the other and prevents a sidewise displacement of the spring A when the saddle is accidentally struck on the side.

The position of the fulcrum, and of the front rocker C, may be varied by adjusting the clasp L forward or backward on the springs as may be required.

In the saddle support above described, there is great freedom of motion to meet vertical and also horizontal shocks, and it makes the saddle very easy riding. The front and rear rockers may swing forward or backward together or independently as may be required, giving the saddle an easy floating support.

It will be seen that the adjustment of the clamp and fulcrum bolt M varies the tension of each member of the double leaf spring at the same time, and affects the tension of the spring as a whole.

What is claimed is:—

1. In a shock-absorbing saddle support, the double leaf spring having its two members arranged one above the other, and a connecting means and a spacing means respectively connecting and engaging the said members at different points near their ends, substantially as set forth.

2. In a shock-absorbing saddle-support, the combination of the two separate leaf spring members arranged one above the other and forming a double leaf spring, connecting means adjustably securing the said members together, and means at the rear of said connecting means for adjustably pressing the said members away from each other, substantially as set forth.

3. In a saddle support, the combination of the two members of the double leaf spring, means for adjustably drawing the said members toward each other at one point, means for holding the said members apart at another point, and a check device which limits the springing apart of the said members, substantially as set forth.

4. In a spring saddle support, the combination of upper and lower leaf springs secured together, depending rockers at the front and rear ends thereof, and means for suspending the saddle from said rockers, substantially as set forth.

5. In a spring saddle support, the combination of upper and lower leaf springs secured together at their front ends and separated at their rear ends, depending rockers at the front and rear ends of the springs, means for suspending the saddle from the rockers comprising a U-shaped spring passing around the front end of the leaf springs, and means for regulating the tension of the leaf springs, substantially as set forth.

6. In a spring saddle support, the combination of upper and lower leaf springs secured together at their front ends and separated at their rear ends, depending rockers at the front and rear ends of the springs, means for suspending the saddle from the rockers, and a fulcrum interposed between the springs and adjustable forward and backward, substantially as set forth.

7. In a spring saddle support, the combination of upper and lower leaf springs having at their forward ends means for securing them together at different degrees of inclination to each other, a fulcrum between the springs and at the rear of such securing means, and means for suspending the saddle from the springs, substantially as set forth.

8. In a spring saddle support, the combination of upper and lower leaf springs secured together at their ends, means for suspending the saddle from the springs, and a check connecting the separated ends of the springs and limiting their separation from each other.

9. In a spring saddle support, the combination with the saddle and a spring device, of front and rear rocker arms depending from the spring device, the saddle stretcher rods, a U-spring attached to the front ends of the stretcher rods and to the lower end of the front rocker arm, and spiral springs attached to the rear ends of the stretcher rods and to the lower end of the rear rocker arm.

10. In a spring saddle support, the combination of upper and lower leaf springs secured together at their front ends and separated at their rear ends, the lower spring having a curved portion 5 out of the normal line of the spring, whereby its longitudinal adjustment regulates the tilt of the saddle, and means for suspending the saddle from the said springs.

11. In a spring saddle support, the combination of a spring device comprising upper and lower members, a check for limiting the springing apart of the said members, and means for adjusting the said members toward and from each other to vary the tension of the spring and the action of the same on the check.

12. In a spring saddle support, the combination of upper and lower leaf springs secured together at their front ends and separated at their rear ends, and a check connected with one of said springs and having a sliding engagement with the other spring to limit the separation of the springs and to guide the same in their motions toward and from each other.

13. In a spring saddle support, the combination of a spring device, front and rear rockers depending therefrom, means for supporting the front end of the saddle on the front rocker, and spiral springs and pivot bearings attached to the said spiral springs interposed between the rear rocker and the rear end of the saddle, substantially as set forth.

14. In a spring saddle support, the combination of upper and lower leaf springs, and a check plate holding said springs under tension, the check plate being releasable to relieve the springs from tension for the purpose of making a spring tension adjustment, substantially as set forth.

15. In a spring saddle support, the combination of a plurality of leaf spring members, and means at one point for spacing such members apart and means at another point for drawing them together, for the purpose of regulating the tension of the spring device as a whole, substantially as set forth.

16. In a spring saddle support, the combination of a plurality of leaf spring members, and means for adjusting the normal inclination or tension of the said members relative to each other, comprising a spacing device at one point and a connecting device at another point in front of the spacing device, which said devices respectively space and connect the said leaf spring members, substantially as and for the purposes described.

In testimony whereof I affix my signature, in presence of two witnesses.

FREDERICK ROBINSON.

Witnesses:
JOHN JAGER,
WILLIAM A. GEIGER.